(12) United States Patent
Suzuki et al.

(10) Patent No.: US 7,029,580 B2
(45) Date of Patent: Apr. 18, 2006

(54) APPARATUS FOR CONCENTRATING SLUDGE

(75) Inventors: Kiyoshi Suzuki, c/o Bureau of Sewerage, Tokyo Metropolitan Government 8-I, Nishi-shinjuku 2-chome, Shinjuku-ku, Tokyo 160-0023 (JP); Kinichiro Kouno, Tokyo (JP); Takashi Etou, Tokyo (JP); Itaru Sakai, Tokyo (JP); Satoru Udagawa, Tokyo (JP); Arimitsu Ishii, Tokyo (JP)

(73) Assignees: Kiyoshi Suzuki, Tokyo (JP); Japan Institute of Wastewater Engineering Technology, Tokyo (JP); JFE Engineering Corporation, Tokyo (JP)

( * ) Notice: Subject to any disclaimer, the term of this patent is extended or adjusted under 35 U.S.C. 154(b) by 37 days.

(21) Appl. No.: 10/486,839

(22) PCT Filed: May 14, 2002

(86) PCT No.: PCT/JP02/04654

§ 371 (c)(1),
(2), (4) Date: Nov. 13, 2003

(87) PCT Pub. No.: WO02/092520

PCT Pub. Date: Nov. 21, 2002

(65) Prior Publication Data

US 2005/0067355 A1    Mar. 31, 2005

(30) Foreign Application Priority Data

| May 14, 2001 | (JP) | 2001-143911 |
| May 14, 2001 | (JP) | 2001-143912 |
| May 14, 2001 | (JP) | 2001-143913 |
| May 14, 2001 | (JP) | 2001-143914 |
| May 14, 2001 | (JP) | 2001-143915 |
| May 14, 2001 | (JP) | 2001-143916 |
| Jan. 29, 2002 | (JP) | 2002-020649 |
| Jan. 29, 2002 | (JP) | 2002-020650 |

(51) Int. Cl.
*C02F 11/14* (2006.01)

(52) U.S. Cl. .................. 210/199; 210/391; 210/396; 210/400

(58) Field of Classification Search ............... 210/609, 210/710, 724, 783, 199, 206, 400, 401, 791, 210/391, 392, 396, 408, 409
See application file for complete search history.

(56) References Cited

U.S. PATENT DOCUMENTS

| 2,769,547 A | * | 11/1956 | Adler .................. 210/273 |
| 4,221,661 A | * | 9/1980 | Shimizu et al. ............ 210/721 |
| 4,792,406 A | | 12/1988 | Allenson et al. |
| 6,063,294 A | * | 5/2000 | Martensson et al. ........ 210/739 |
| 6,872,779 B1 | * | 3/2005 | Mori et al. ................. 525/118 |

FOREIGN PATENT DOCUMENTS

| JP | 46-17036 | 5/1971 |
| JP | 54-042362 A | 4/1979 |
| JP | 59-052510 A | 3/1984 |
| JP | 59-179200 A | 10/1984 |
| JP | 58-051998 A | 3/1986 |
| JP | 03-094900 A | 4/1991 |
| JP | 11-216312 | 8/1999 |
| JP | 2000-005506 A | 1/2000 |
| JP | 2000-262817 A | 9/2000 |

OTHER PUBLICATIONS

Database WPI Week 198318, Derwent Publications Ltd., London, GB; An 1983-42970K, XP002299921 "Dehydrating organic sludge" & JP 58 051998 A (Ebara Inflilco KK), Mar. 26, 1983.

* cited by examiner

*Primary Examiner*—Peter A. Hruskoci
(74) *Attorney, Agent, or Firm*—Frishauf, Holtz, Goodman & Chick, P.C.

(57) ABSTRACT

A sludge concentrating apparatus comprising a sludge tank for storing sludge and a filter cloth having a shape of endless belt which turns between upper and lower rollers, further comprising filtering means of which at least the lowermost of rollers is immersed in the sludge, washing means of the filter cloth, and a filtrate chamber having a filtrate introducing port in contact with the filter cloth and a weir, wherein a sludge distributing tank serving as sludge introducing means into the sludge tank is provided near the upper end of the filtrate introducing port, and a concetrated sludge discharge tank serving as concertrated sludge introducing means with the filter cloth in between; said sludge concentrating apparatus further comprising coagulant adding means for adding an acid, and a flow adjustment device serving as a sludge uniform feeding means which feeds sludge fed into the sludge tank uniformly in the width direction of the filter cloth. It is thus possible to efficiently concentrate sludge produced in a sewage disposal plant in a large quantity without depending upon properties of sludge.

12 Claims, 14 Drawing Sheets

APPARATUS FOR CONCENTRATING SLUDGE

This application is a U.S. National Phase Application under 35 U.S.C. 371 of International Application PCT/JP02/04654, filed May 14, 2002.

TECHNICAL FIELD

The present invention relates to a method for concentrating sludge and an apparatus thereto. More particularly, the invention relates to a method for concentrating sludge and an apparatus used in said method for concentrating sludge which permit subjecting sludge occurring, for example, in a sewage disposal plant to solid/liquid separation and a concentrating treatment in a large quantity and at a high efficiency, without depending upon properties of sludge.

BACKGROUND ART

A sludge concentrating method commonly applied in a general sewage disposal plant will now be described with reference to the drawings.

FIG. 16 is a flowchart illustrating the sludge concentrating method in the sewage disposal plant.

As shown in FIG. 16, sewage flowing into a primary settling tank 1 is subjected to a solid/liquid separation through a gravity precipitating treatment. Then, supernatant water after the precipitation treatment is fed to a reaction tank 2, where it is subjected to an activated sludge concentration. The sewage thus treated in the activated sludge concentration is fed to a secondary settling tank 3, where it is subjected again to a solid/liquid separation through a gravity precipitating treatment. The resultant supernatant water obtained in the secondary settling tank 3 is fed to a sterilizing tank 4, where it is sterilized. The treated water resulting from sterilization of sewage is discharged to rivers, lakes or sea water.

On the other hand, sedimentation sludge resulting from the primary settling tank 1 and excess sludge resulting from the secondary settling tank 3 are usually mixed. The resultant mixed sludge is fed to a sludge concentrator 5. The mixed sludge fed to the sludge concentrator 5 has usually a solid concentration of about 1% or so. The mixed sludge is subjected to a concentration treatment in the sludge concentrator 5 through gravity precipitation. This results in a concentrated sludge having a solid concentration of about 2 to 3%. The resultant concentrated sludge is stored in a sludge storage tank 6. The sludge stored in the sludge storage tank 6 is dehydrated by a dehydrator 7. Dehydrated cakes are thus obtained.

In an ordinary sewage disposal plant, as described above, gravity precipitation is used for concentration treatment of mixed liquid of sewage flowing down and sludge (hereinafter referred to as "sludge"). More specifically, the sewage flowing down is subjected to solid/liquid separation by gravity precipitation in the primary settling tank 1. The sewage concentrated through activated sludge is subjected to the solid/liquid separation by gravity precipitation in the secondary settling tank 3. The mixed sludge is concentrated by gravity precipitation in the sludge concentrator 5.

The above-mentioned sludge concentrating method based on gravity precipitation requires only small power consumption, thus providing an advantage of a low treatment cost. However, the apparatus for sludge concentration based on gravity precipitation has a large area of installation, and has a problem in that the treatment ability of the apparatus largely depends upon properties of sludge and the water temperature to be treated.

In recent years, particularly, precipitation property of sludge is becoming worse by causes such as increase of organic matters in sludge and putrefaction of sludge transported over a long distance as a result of achievement of intensive disposal of sludge. Consequently, it is the current reality that in the sludge concentrator in a sewage disposal plant conducting intensive disposal of sludge, it is becoming more difficult to ensure a concentrated sludge constantly having a solid concentration of 2% or higher through sludge concentration method based on gravity precipitation.

When a concentrated sludge of a prescribed concentration is unavailable, the amount of mixed liquid of sludge fed to dehydrating equipment in the latter step becomes larger. This not only makes it difficult to operate the dehydrator in stable, but also requires excessive facilities for dehydration apparatus.

For the purpose of solving these problems, mechanical concentrating apparatuses such as a centrifugal separator are being adopted recently, but this method is economically unfavorable because of the large power consumption.

In high-level treatment methods such as removal of nitrogen or phosphorus of which the positive adoption is currently considered with a view to preventing eutrophication of public waters, the reaction tank is operated with a higher solid concentration than in the standard activated sludge process in many cases in order to increase a reaction rate. It becomes therefore necessary to apply a solid/liquid separation treatment to sludge-mixed liquid having high concentration flowing from the reaction tank. In a metropolis in particular, where many secondary settling tanks coping with the standard activated sludge process are already in practical operation, adoption of a high-level treatment requires replacement of the secondary settling tank 3 in FIG. 16, or development of new sludge concentrating means capable of complementing the same.

Demand for a technique permitting concentration of sludge for certain without relying upon gravity precipitation is now increasing as described in the foregoing.

From the above-mentioned point of view, the present inventors developed a sludge concentrating apparatus disclosed in Japanese Unexamined Patent Application Publications Nos. 11-216312, 2000-5506 and 2000-262817.

The present inventors further studied the above-mentioned conventional sludge concentrating apparatus, and obtained the following findings. By adding the coagulant, then slowly transferring the coagulated flock, and uniformly feeding the same in the width direction of filter cloth, it is possible to take large steps toward improving efficiency of concentration of sludge, and they completed the present invention.

That is, the present invention has an object to provide a sludge concentrating apparatus which permits, when disposing of sludge by using the above-mentioned conventional sludge concentrating apparatus, efficient concentrating treatment in a large quantity without depending upon properties of sludge.

DISCLOSURE OF INVENTION

A first invention provides a method for concentrating sludge, which concentrates a mixed sludge of a sludge in a primary settling tank and an excess sludge by using a sludge concentrating apparatus which comprises a sludge tank storing sludge, and a filter cloth having a shape of endless belt turning between a plurality of rollers, further comprises a filtrate chamber having filtering means in which at least the lowermost of the rollers is immersed in the sludge, washing means of the filter cloth and means for keeping a filtrate introducing port in close contact with the filter cloth and the liquid level at a constant state, wherein sludge introducing means to the sludge tank is provided near the upper end of the filtrate introducing port, and concentrated sludge discharge means from the sludge tank is provided at a position substantially opposite to the sludge introducing means with the filter cloth in between; the sludge concentrating method being characterized in that an organic macromolecular coagulant is previously added to the mixed sludge.

A second invention provides a method for concentrating sludge which concentrates an excess sludge by using a sludge concentrating apparatus which comprises a sludge tank storing sludge, and a filter cloth having a shape of endless belt turning between a plurality of rollers, further comprises a filtrate chamber having filtering means in which at least the lowermost of the rollers is immersed in the sludge, washing means of the filter cloth and means for keeping a filtrate introducing port in close contact with the filter cloth and the liquid level at a constant state, wherein sludge introducing means to the sludge tank is provided near the upper end of the filtrate introducing port, and concentrated sludge discharge means from the sludge tank is provided at a position substantially opposite to the sludge introducing means with the filter cloth in between; the sludge concentrating method being characterized in that an inorganic coagulant and an organic macromolecular coagulant are previously added to the excess sludge.

A third invention provides the sludge concentrating method according to the second invention, wherein poly ferric sulfate is used as the inorganic coagulant.

A fourth invention provides the sludge concentrating method according to any one of the first to third inventions, wherein a cationic coagulant is used as the organic macromolecular coagulant.

A fifth invention provides a sludge concentrating method comprising a step of adding an acid and an inorganic coagulant to sludge, and a step of concentrating the sludge to which the acid and the inorganic coagulant has been added.

A sixth invention provides the sludge concentrating method according to the fifth invention, wherein the acid is sulfuric acid and the inorganic coagulant is poly ferric sulfate.

A seventh invention provides the sludge concentrating method according to the fifth or sixth invention, wherein supernatant water, separated water or filtrate has a pH within a range from 4 to 6.

An eighth invention provides a sludge concentrating apparatus which comprises a sludge tank storing sludge, and a filter cloth having a shape of endless belt turning between a plurality of rollers, further comprises a filtrate chamber having filtering means in which at least the lowermost of the rollers is immersed in the sludge, cleaning means of the filter cloth and means for keeping a filtrate introducing port in close contact with the filter cloth and the liquid level at a constant state, wherein sludge introducing means to the sludge tank is provided near the upper end of the filtrate introducing port, and concentrated sludge discharge means from the sludge tank is provided at a position substantially opposite to the sludge introducing means with the filter cloth in between.

A ninth invention provides the sludge concentrating apparatus according to the eighth invention, further comprising coagulant adding means which adds the coagulant to the sludge fed into the sludge tank, and acid adding means which adds the acid.

A tenth invention provides the sludge concentrating apparatus according to the ninth invention, wherein the acid is sulfuric acid, and the inorganic coagulant is poly ferric sulfate.

An eleventh invention provides the sludge concentrating apparatus according to any one of the eighth to tenth inventions, further comprising sludge uniform feeding means which supplies sludge fed into the sludge tank uniformly in the width direction of the filter cloth.

A twelfth invention provides the sludge concentrating apparatus according to the eleventh invention, wherein the sludge uniform feeding means has at least any one of a submerged weir and a flow adjustment device.

A thirteenth invention provides the sludge concentrating apparatus according to any one of the eighth to twelfth inventions, wherein the distance between the inner wall surface of the sludge tank at discharging side of the concentrated sludge and the outer surface of the filter cloth is smaller than the distance between the inner wall surface of the sludge tank at the sludge feeding side and the outer surface of the filter cloth.

A fourteenth invention provides the sludge concentrating apparatus according to any one of the eighth to thirteenth inventions, further comprising sludge uniform discharge means which discharges sludge from the sludge tank uniformly in the width direction of the sludge tank without pilling up the concentrated sludge in the sludge tank and a deposit contained therein.

A fifteenth invention provides the sludge concentrating apparatus according to the fourteenth invention, wherein the sludge uniform discharge means is provided in the downstream of an exit weir of the concentrated sludge discharge means and has a roller and deposit stripping means.

A sixteenth invention provides the sludge concentrating apparatus according to any one of the eighth to fifteenth inventions, wherein the cleaning means has a plurality of cleaning spray nozzles arranged in a staggered form alternately with a single or a plurality of header pipes.

A seventeenth invention provides the sludge concentrating apparatus according to any one of the eighth to sixteenth inventions, wherein the cleaning means is oscillatory.

BEST MODE FOR CARRYING OUT THE INVENTION

An embodiment of the sludge concentrating apparatus for the implementation of the sludge concentrating method of the present invention will be described with reference to the drawings.

Figure 1:
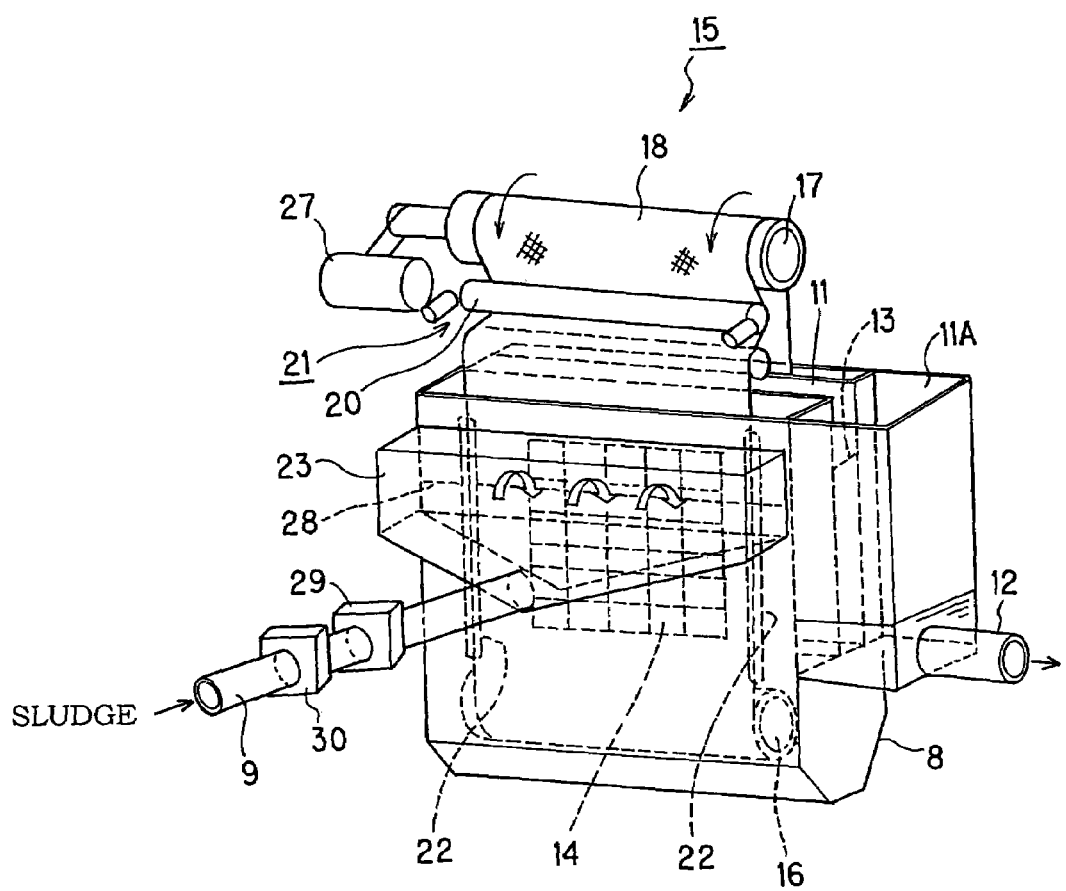
FIG. 1 is a perspective view, as viewed from the filter cloth descending side, illustrating a sludge concentrating apparatus of the present invention.
Figure 2:
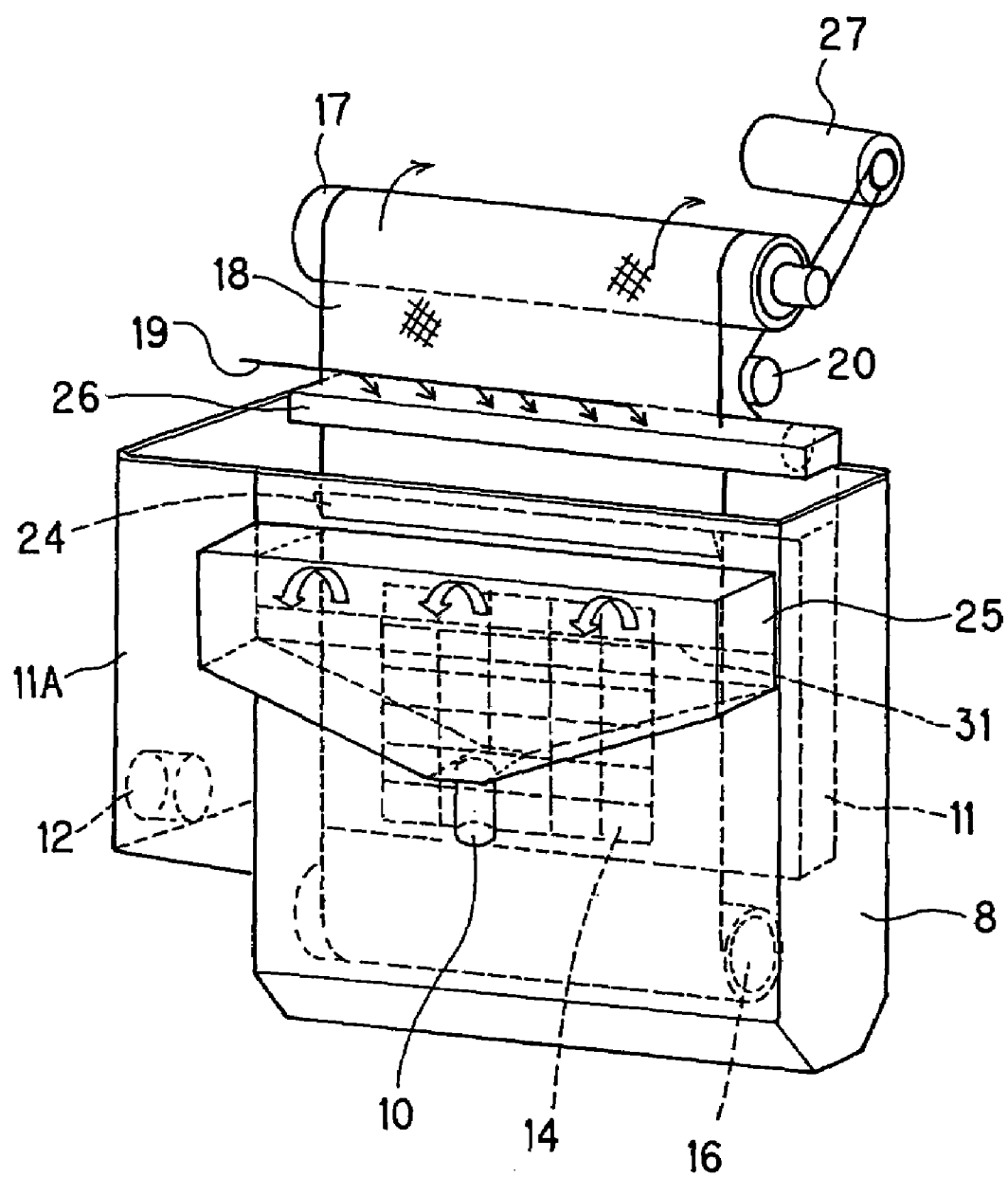
FIG. 2 is a perspective view, as viewed from the filter cloth ascending side, illustrating a sludge concentrating apparatus of the present invention.
Figure 3:
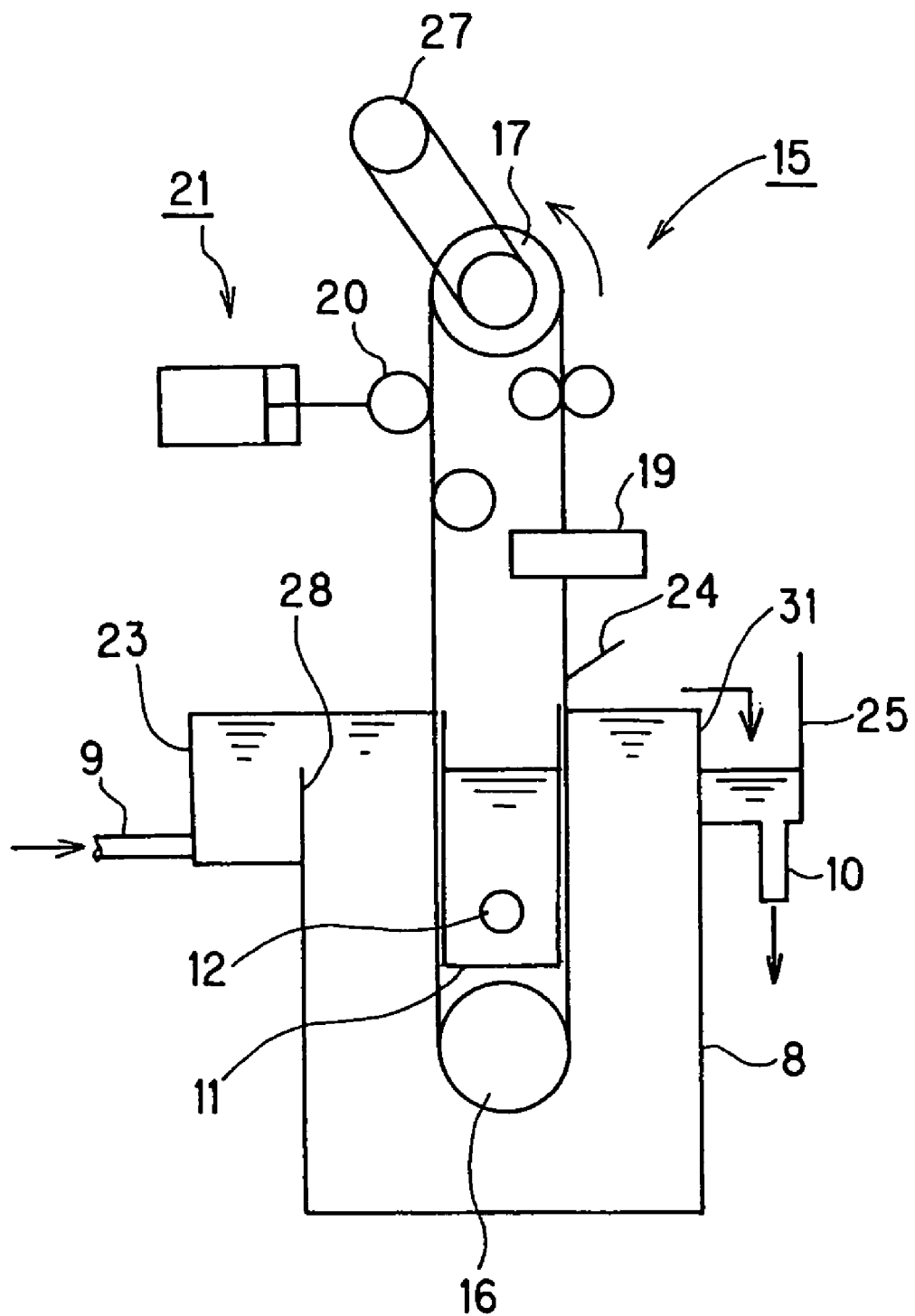
FIG. 3 is a sectional view illustrating a sludge concentrating apparatus of the present invention.
Figure 4:
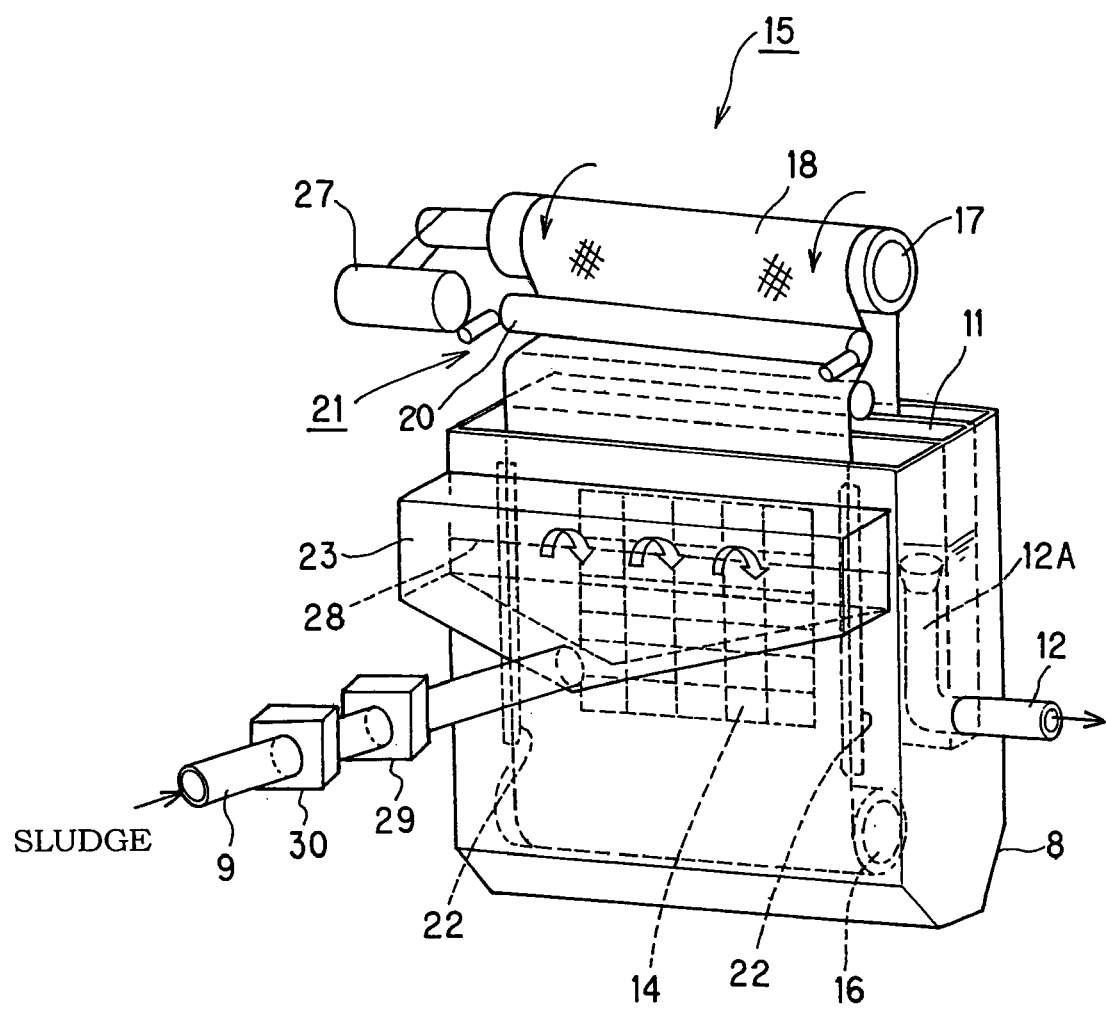
FIG. 4 is a; perspective view, as viewed from the filter cloth descending side, illustrating another sludge concentrating apparatus of the present invention, wherein a filtrate chamber is provided in the sludge tank.
Figure 5:
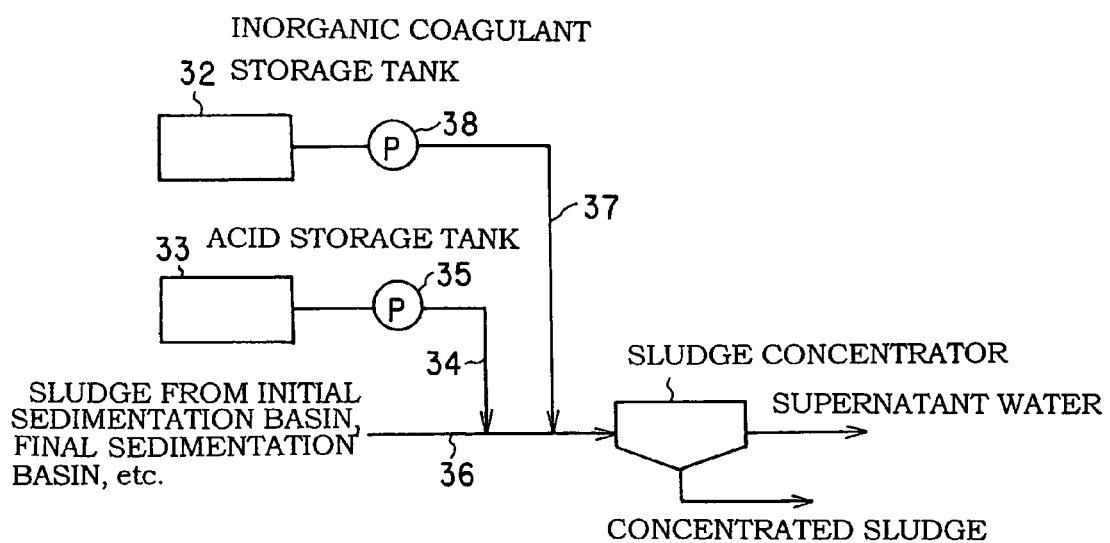
FIG. 5 illustrates the method for adding an acid and a coagulant to sludge.

FIG. 1 is a perspective view, as viewed from the filter cloth descending side, illustrating a sludge concentrating apparatus of the present invention; FIG. 2 is a perspective view, as viewed from the filter cloth ascending side, illustrating the sludge concentrating apparatus of the present invention; FIG. 3 is a sectional view illustrating the sludge concentrating apparatus of the present invention; FIG. 4 is a perspective view, as viewed from the filter cloth descending side, illustrating another sludge concentrating apparatus of the present invention wherein a filtrate chamber is provided in the sludge tank; and FIG. 5 illustrates the method for adding an acid and a coagulant to sludge.

In FIGS. 1 to 4, reference numeral 8 represents a sludge tank having a sludge feed pipe 9 and a concentrated sludge discharge pipe 10. Sludge is fed from the sludge feed pipe 9 via an inlet weir described later into the sludge tank 8.

Reference numeral 11 represents a filtrate chamber provided in the sludge tank 8. Outside the sludge tank 8, an exit side chamber 11A is formed integrally with the filtrate chamber 11. A filtrate discharge pipe 12 is provided in the exit side chamber 11A. A filtrate introducing port 14 communicating with the sludge tank 8 is formed on each sidewall facing each other of the filtrate chamber 11. Supply of sludge into the sludge tank 8 and discharge of filtrate therefrom are adjusted so that the liquid level of sludge in the sludge tank 8 is always above that in the filtrate chamber 11. This is to filter sludge in the sludge tank 8 through natural flow from the filtrate introducing port 14 via a filtering means described later into the filtrate chamber 11. Pressure in the filtration can be adjusted by adjusting the difference between the sludge level in the sludge tank 8 and the liquid level in the filtrate chamber 11. A weir 13 for keeping a constant liquid level in the filtrate chamber 11 is provided at the boundary with the exit side chamber 11A of the filtrate chamber 11.

For the purpose of further improving the filtering efficiency of sludge, a plurality of filtrate chambers 11 may be formed in the sludge tank 8. When forming a plurality of filtrate chambers 11, at least one filtrate introducing port 14 is formed in each filtrate chamber 11. There is no particular limitation on the shape of the filtrate introducing port 14, but it should preferably be shaped into a lattice form in consideration of strength.

As shown in FIG. 4, the filtrate chamber 11 may be provided completely within the sludge tank 8. In this case, a riser tube 12A formed by extending the filtrate discharge pipe 12 into the filtrate chamber 11 and arranging it vertically, and having a telescopic valve at the leading end thereof can be adopted, as shown in FIG. 4, as means for always keeping a constant liquid level in the filtrate chamber 11. By providing the filtrate chamber 11A completely within the sludge tank 8, it is possible to downsize the sludge concentrating apparatus.

Reference numeral 15 represents filtering means having the lower part immersed in the sludge tank 8. The filtering means 15 is for filtering sludge fed into the sludge tank, and has a filter cloth 18 forming an endless belt which turns endlessly in the vertical direction under the effect of driving means 27 between a lower roller 16 and an upper roller 17 while covering the filtrate introducing port 14. The filter cloth 18 is made of polyester, polypropylene or the like, and turns in a direction and continuously while covering the filtrate introducing port 14.

Reference numeral 23 represents a sludge distributing tank having a shape enlarged upward in the tapered form as sludge introducing means. It is provided on a sidewall of the sludge tank 8 on the filter cloth descending side, and has a sludge feeding pipe 9. An inlet side weir 28 is provided at a sludge discharge flow port of the sludge distributing tank 23. As a result, sludge fed from the sludge feeding pipe 9 is uniformly supplied in the width direction of the filter cloth 18 in the sludge tank 8.

Reference numeral 24 represents solid stripping means for removing solid materials adhering to the filter cloth 18. The solid stripping means 24 is installed above the sludge level in the sludge tank 8, and gradually strips off the solid materials adhering to the ascending filter cloth 18. As the solid stripping means 24, stripping means based on scraper having a structure of scraping solid sludge cakes adhering to the filter cloth 18 by means of a scraper is the most desirable. Other applicable means include stripping means based on air, i.e., stripping means of removing sludge cakes adhering to the filter cloth 18 by ejecting air toward the filter cloth 18, stripping means based on vibration, i.e., stripping means of stripping sludge cakes adhering to the filter cloth 18 by causing the filter cloth 18 to vibrate mechanically or by ultrasonic waves. Stripped solid materials fall into the sludge tank 8, and recovered from the concentrated sludge discharge pipe 10 via the above-mentioned exit side weir.

Reference numeral 19 represents nozzle-type cleaning means for cleaning the filter cloth 18. The cleaning means 19 is installed above the solid stripping means 24 on the sludge surface on the filter cloth ascending side in the sludge tank 8, and further removes solid materials which could not be stripped off by the solid stripping means 24. The cleaning means 19 should preferably be cleaning means based on water, i.e., the cleaning means of removing sludge cakes adhering to the filter cloth by ejecting water toward the filter cloth 18. Discharge water in the cleaning produced by the cleaning means 19 is recovered by cleaning discharge water recovering means 26.

The cleaning discharge water recovering means 26 is composed of a box-shaped receiving tank having an opening upper ceiling board, and collects cleaning discharge water by installing the cleaning means 19 in this receiving tank or on the upper part of the receiving tank. The thus collected cleaning discharge water is returned to the sludge tank 8 on the filter cloth descending side for filtration again.

Reference numeral 25 represents a concentrated sludge discharge tank serving as concentrated sludge discharge means, and has a concentrated sludge discharge pipe 10. The concentrated sludge discharge tank 25 has an exit side weir 31 for recovering concentrated sludge which is concentrated in the sludge tank 8. By installing the exit side weir 31 so as to project toward the sludge tank 8 on the side of the sludge tank 8 on the filter cloth ascending side, concentrated sludge can be collected uniformly in the width direction of the filter cloth 18 through natural flowing. By causing the exit side weir 31 to project toward inside of the sludge tank 8, the solids stripped off by the solid stripping means 24 fall onto the exit side weir 31, and are collected together with concentrated sludge.

Reference numeral 21 represents filter cloth tensioning means comprising a pair of stretching rollers 20, which give an appropriate tension to the filter cloth 18. Since the filter cloth 18 may be elongated through continuous running for a long period of time, an appropriate tension is constantly imparted to the filter cloth 18 by filter cloth tensioning means 21. Means using an air cylinder is the most desirable as filter cloth tensioning means 21. This type permits constant tensioning of the filter cloth 18 with a uniform force, and installation of tension detector means enables to take an emergency stop action upon breakage of the filter cloth 18.

Provision of meandering prevention means for the filter cloth 18 makes it possible to maintain a stable operation of the filter cloth 18. The meandering prevention means should preferably be a nip pressure type meandering correcting apparatus commonly used for automatic coiling of fibers or paper. This apparatus corrects the position of the filter cloth 18 always at the center by arranging a pair of nip-pressure type meandering correctors on each side of the filter cloth 18 so that each of the right and left nips pulls the filter cloth 18 toward the end, and when meandering of the filter cloth 18 occurs by some cause or other and the cloth leans to the right or the left, reducing the nip pressure on the leaning side.

Reference numeral 22 represents sealing means for sealing the filtrate introducing port 14. While the filtrate introducing port 14 is usually covered with the filter cloth 18, sludge may mix directly into the filtrate chamber 11 without passing through the filter cloth at the width direction end of the filter cloth 18. This is prevented by use of the sealing means 22. When using the sealing means 22, it is desirable to press it against the boundary between the width-direction end of the filter cloth 18 and the filtrate introducing port 14 so that running of the filter cloth is not prevented by the resin plate.

Reference numeral 29 represents organic macromolecular coagulant adding means for adding an organic macromolecular coagulant to sludge. For adding the organic macromolecular coagulant to sludge, it is desirable to provide organic macromolecular coagulant storing means separately, and line-inject the organic macromolecular coagulant to the sludge feed pipe 9.

Reference numeral 30 represents inorganic coagulant adding means necessary when adding an inorganic coagulant to sludge. For adding the inorganic coagulant to sludge, it is desirable to provide inorganic coagulant storing means separately, and line-inject the inorganic coagulant to the sludge feed pipe 9.

For adding the coagulant, the most desirable method is to first add the inorganic coagulant to the sludge to be disposed of, and then add the organic macromolecular coagulant. It is also possible to apply a method of adding simultaneously the inorganic coagulant and the organic macromolecular coagulant considering the piping of the plant, or a method of first adding the organic macromolecular coagulant, and then adding the inorganic coagulant.

The method for concentrating sludge of the present invention by mean of the above-mentioned sludge concentrating apparatus will now be described.

When the sludge to be disposed of is exclusively sludge obtained in the initial sedimentation basin or a mixed sludge of an excess sludge and the initial sedimentation basin sludge, the coagulant added to the sludge to be disposed of should preferably comprise exclusively an organic macromolecular coagulant. Preferable organic macromolecular coagulants added by the organic macromolecular coagulant adding means 29 include a cationic coagulant, a nonionic coagulant, and an anionic coagulant. A cationic coagulant is particularly preferable.

When the sludge to be disposed of exclusively comprises an excess sludge, or when sufficient filtering and concentration cannot be accomplished with an organic macromolecular coagulant alone, an organic macromolecular coagulant and an inorganic coagulant are used simultaneously. The inorganic coagulant to be added to sludge should preferably be a coagulant mainly comprising iron or aluminum, and poly ferric sulfate is particularly preferable because of the possibility to use against bad odor and to use for removal of phosphorous The ratio of addition of the inorganic coagulant, varying with properties of sludge, should preferably be within a range from 5 to 30% relative to the solid content in sludge, or particularly preferably, within a range from 5 to 15.%.

The ratio of addition of the organic macromolecular coagulant, varying with properties of sludge, should preferably be within a range from 0.01 to 0.2% relative to the solid content in sludge when simultaneously using with an inorganic coagulant, or particularly preferably, within a range from 0.05 to 0.1%. When employing exclusively the organic macromolecular coagulant, the preferable range is from 0.1 to 0.3% relative to the solid content in sludge, or a particularly preferable range is from 0.1 to 0.2%.

The sludge to which at least any of the inorganic coagulant and the organic macromolecular coagulant is fed from the sludge feed pipe 9 into the sludge distributing tank 23. Since an inlet side weir 28 is provided in the sludge distributing tank 23, sludge is fed into the sludge tank 8 uniformly in the width direction of the filter cloth 18.

When mixed sludge flows into the sludge tank 8, solid materials in the mixed sludge are filtered by the filter cloth 18 running continuously, and the filtrate naturally flows from the filtrate introducing port 14 into the filtrate chamber 11. Because the filter cloth 18 runs while covering the filtrate introducing port 14, and in addition, sealing means is provided, there is no risk of the mixed sludge in the sludge tank 8 directly flowing into the filtrate chamber 11. As a result, the mixed sludge in the sludge tank 8 is gradually concentrated from the filter cloth descending side toward the filter cloth ascending side.

The thus concentrated sludge passes through the exit side weir 31 provided in the sludge tank 8 on the filter cloth ascending size, and is discharged outside the sludge tank 8 from the concentrated sludge discharge pipe 10. On the other hand, the filtrate flowing into the filtrate chamber 11 is discharged, through the weir 13 in the case of the sludge concentrating apparatus shown in FIG. 1, and through the riser tube 12A in the case of the sludge concentrating apparatus shown in FIG. 4, from the filtrate discharge pipe 12 to outside the filtrate chamber 11, and collected. In all cases, the filtrate level in the filtrate chamber 11 is kept constant by the weir 13 or the riser tube 12A.

Along with the progress of filtration, sludge cakes adhere to the filter cloth 18 and accumulate there. These sludge cakes are gradually stripped off by the solid stripping means 24, discharged from the exit side weir 31 to outside the sludge tank 8, and collected together with concentrated sludge. While most of the adhering sludge cakes are stripped off by the solid stripping means 24, sludge cakes not stripped off are gradually removed by the cleaning means 19 and regenerated. The filtering efficiency of the filter cloth 18 is therefore never reduced, and the filtering means 15 is constantly operated stably.

As cleaning discharge water produced by the cleaning means 19 is collected by the cleaning discharge water collecting means 26, the concentrated sludge is never diluted on the filter cloth ascending side as a result of mixture of cleaning discharge water into the sludge tank 8 on the filter cloth ascending side. Cleaning discharge water collected by the cleaning discharge water collecting means 26 is returned to the sludge tank on the filter cloth ascending side and filtered again.

When disposing of mixed sludge by adding a coagulant thereto, filtrate has a higher clarity than when disposing thereof without adding a coagulant. When using water for the cleaning means 19, therefore, the filtrate in the filtrate chamber 11 can be used as cleaning water. By thus using the filtrate in the filtrate chamber 11, it is possible to prevent the consumption of disposal water from increasing.

Provision of filter cloth tensioning means 21 and filter cloth meandering preventing means eliminates the risk of racing or meandering of the filter cloth 18 even upon occurrence of elongation of the filter cloth 18. This permits achievement of continuous running of the filter cloth 18, thus ensuring safe operation for a long period of time. Even upon breakage of the filter cloth, the apparatus can be emergency-stopped, thus providing remarkable merits in practice.

In respect of automatic control of the apparatus, it becomes possible to perform continuous disposal with a constant solid concentration of the concentrated sludge, thus facilitating the dehydrating operation in the next dehydration step by providing solid concentration detecting means and feed amount detecting means of sludge fed to the sludge concentrating apparatus, and in addition, by providing means detecting the solid concentration and the amount of discharge of the filtrate discharged from the filtrate chamber 11.

When concentrating sludge by use of the above-mentioned sludge concentrating apparatus, an acid may be added in addition to the coagulant added to the sludge.

The acid should preferably be sulfuric acid or hydrochloric acid. When the coagulant used is based on sulfuric acid, however, it is desirable to use sulfuric acid, and to use hydrochloric acid in the case of a hydrochloric acid based coagulant. The combination of poly ferric sulfate and sulfuric acid is particularly preferable. The feed amount of the acid is adjusted by measuring pH of supernatant water, separated water or filtrate from the above-mentioned sludge concentrating apparatus so that pH has a certain value (from 4 to 6). Since this ensures a constant feed amount of the inorganic coagulant, it is possible to reduce the feed amount of the inorganic coagulant, and to conduct stable solid/liquid separation and concentration.

The method for adding the coagulant and the acid to sludge comprises, as shown in FIG. 5, the steps of providing an inorganic coagulant storage tank 32 and an acid storage tank 33, sending the acid in the acid storage tank 33 into a pipeline 36 or a pipeline 37 having a feeding pump 38 by means of a feeding pump 35, mixing the sludge and the inorganic coagulant, and feeding the resultant mixture to the sludge concentrator. The point where the acid is fed to the pipeline 36 via the pipeline 34 may be before or after the supply of the inorganic coagulant to the pipeline 36 from the pipeline 37. Preferably, it should be before supply of the inorganic coagulant, as shown in FIG. 5.

EXAMPLES

The present invention will now further be described by means of examples.

Example 1

A mixed sludge comprising a mixture of sludge in a primary settling tank and an excess sludge of a sewage disposal plant (solid content in excess sludge: 50%) was concentrated. The mixed sludge had an SS concentration of 0.5% (in average). A cationic coagulant was added as an organic macromolecular coagulant in a fixed amount of 0.1% relative to the solid concentration. For comparison, concentration was carried out by adding an inorganic coagulant (poly ferric sulfate only) in a fixed amount of 15% relative to the solid concentration. The result is shown in Table 1.

TABLE 1

| | SS concentration in filtrate | Throughput | Solids Concentration of Concentrated sludge |
|---|---|---|---|
| Inorganic coagulant (Comparative Example) | 90 mg/l | 30 m$^3$/h | 3.9% |
| Organic macromolecular coagulant (Example of Invention) | 40 mg/l | 65 m$^3$/h | 4.1% |

As is known from Table 1, in the case of the Example of the present invention, the SS concentration of the filtrate is lower, with a better concentration efficiency, and the throughput is larger as compared with the Comparative Example.

Example 2

An excess sludge of a sewage disposal plant was concentrated. The excess sludge had an SS concentration of 0.8% (in average). As an inorganic coagulant, poly ferric sulfate was added in a fixed amount of 15% relative to the solid content. As an organic macromolecular coagulant, a cationic coagulant was added in a fixed amount of 0.05% relative to the solid content. As a comparative example, concentration was conducted by adding only an inorganic coagulant (poly ferric sulfate) in an amount of 15% relative to the solid content. The result is shown in Table 2.

TABLE 2

|  | SS concentration of filtrate | Throughput | Solids Concentration of Concentrated sludge |
|---|---|---|---|
| Inorganic coagulant only (Comparative Example) | 140 mg/l | 23 m³/h | 3.8% |
| Inorganic coagulant and organic macromolecular coagulant added (Example of Invention) | 55 mg/l | 51 m³/h | 4.0% |

As is clear from Table 2, in the case of Example of the present invention, the SS concentration of supernatant water is lower, with a better concentration efficiency, and the throughput is larger than in Comparative Example.

Another example of the present invention in which an acid was added to sludge and sludge was concentrated in the above-mentioned sludge concentrating apparatus will now be described.

Example 3

A mixed sludge comprising a mixture of sludge in a primary settling tank and an excess sludge of a sewage disposal plant was concentrated by the gravity concentrating method. The mixed sludge had an SS concentration of 0.9% (in average), and a $PO_4$—P concentration of 36 mg/l. Sulfuric acid was added as an acid so that supernatant water had a pH of 6. Poly ferric sulfate was added as a coagulant in a fixed amount of 15% relative to the solid content. As a Comparative Example, sludge was concentrated by adding only a coagulant (poly ferric sulfate) in a fixed amount of 20% relative to the solid content without adding an acid or another coagulant. The result is shown in Table 3.

TABLE 3

|  | SS concentration of supernatant water | $PO_4$—P concentration of supernatant water | Solids Concentration of Concentrated sludge |
|---|---|---|---|
| Acid or coagulant not added (Comparative Example) | 1760 mg/l | 35 mg/l | 1.8% |
| Acid not added and coagulant added (Comparative Example) | 850 mg/l | 3 mg/l | 2.1% |
| Acid and coagulant added (Example of Invention) | 210 mg/l | 2 mg/l | 2.4% |

As is clear from Table 3, in the Example of the present invention in which an acid and a coagulant were added, the SS concentration of supernatant water was lower, with a better concentration efficiency, and $PO_4$—P could sufficiently be removed as compared with the case with no addition of an acid or a coagulant, and the case with addition of only a coagulant.

Example 4

An excess sludge of a sewage disposal plant was concentrated by the centrifugal concentrating method. The excess sludge had an SS concentration of 0.8% (in average) and a $PO_4$—P concentration of 34 mg/l. Sulfuric acid was added as an acid so that the separated liquid had a pH of 5. Poly ferric sulfate was added as a coagulant in a fixed amount of 15% relative to the solid content. As a Comparative Example, concentration was carried out by adding only a coagulant (poly ferric sulfate) in a fixed amount of 20% without adding an acid or a coagulant. The result is shown in Table 4.

TABLE 4

|  | Separated liquid concentration | $PO_4$—P concentration of separated liquid | Solids Concentration of Concentrated sludge |
|---|---|---|---|
| Acid or coagulant not added (Comparative Example) | 2160 mg/l | 34 mg/l | 1.8% |
| Acid not added and coagulant added (Comparative Example) | 1100 mg/l | 5 mg/l | 3.1% |
| Acid and coagulant added (Example of Invention) | 190 mg/l | 3 mg/l | 4.4% |

As is evident from Table 4, in the Example of the present invention in which an acid and a coagulant were added, the SS concentration of supernatant water was lower, with a better concentration efficiency, and $PO_4$—P could sufficiently be removed as compared with the case with no addition of an acid or a coagulant, and the case with addition of only a coagulant.

Example 5

A mixed sludge resulting from mixture of sludge in a primary settling tank and an excess sludge of a sewage disposal plant was concentrated by using the above-mentioned filter cloth filtering concentrator. The mixed sludge had an SS concentration of 0.3% (in average) and a $PO_4$—P concentration of 41 mg/l. Sulfuric acid was added as an acid so that the filtrate had a pH of 5.5. Poly ferric sulfate was added as a coagulant in a fixed amount of 15% relative to the solid content. As a Comparative Example, only a coagulant (poly ferric sulfate) was added in a fixed amount of 20% relative to the solid content. Sludge was concentrated as another Comparative Example without adding an acid or a coagulant. The result is shown in Table 5.

TABLE 5

|  | Filtrate concentration | $PO_4$—P concentration of filtrate | Solids Concentration of Concentrated sludge |
|---|---|---|---|
| Acid or coagulant not added (Comparative Example) | 1160 mg/l | 41 mg/l | 2.8% |
| Acid not added and coagulant added (Comparative Example) | 190 mg/l | 0.5 mg/l | 4.0% |
| Acid and coagulant added (Example of Invention) | 40 mg/l | 0.1 mg/l | 4.1% |

As is clear from Table 5, in Example of the present invention in which an acid and a coagulant were added, the SS concentration of separated liquid was lower, with a better concentration efficiency, and $PO_4$—P could sufficiently be removed as compared with the case with no addition of an acid or a coagulant, and the case with addition of only a coagulant.

Another sludge concentration apparatus of the present invention will now be described with reference to the drawings.

Figure 6:
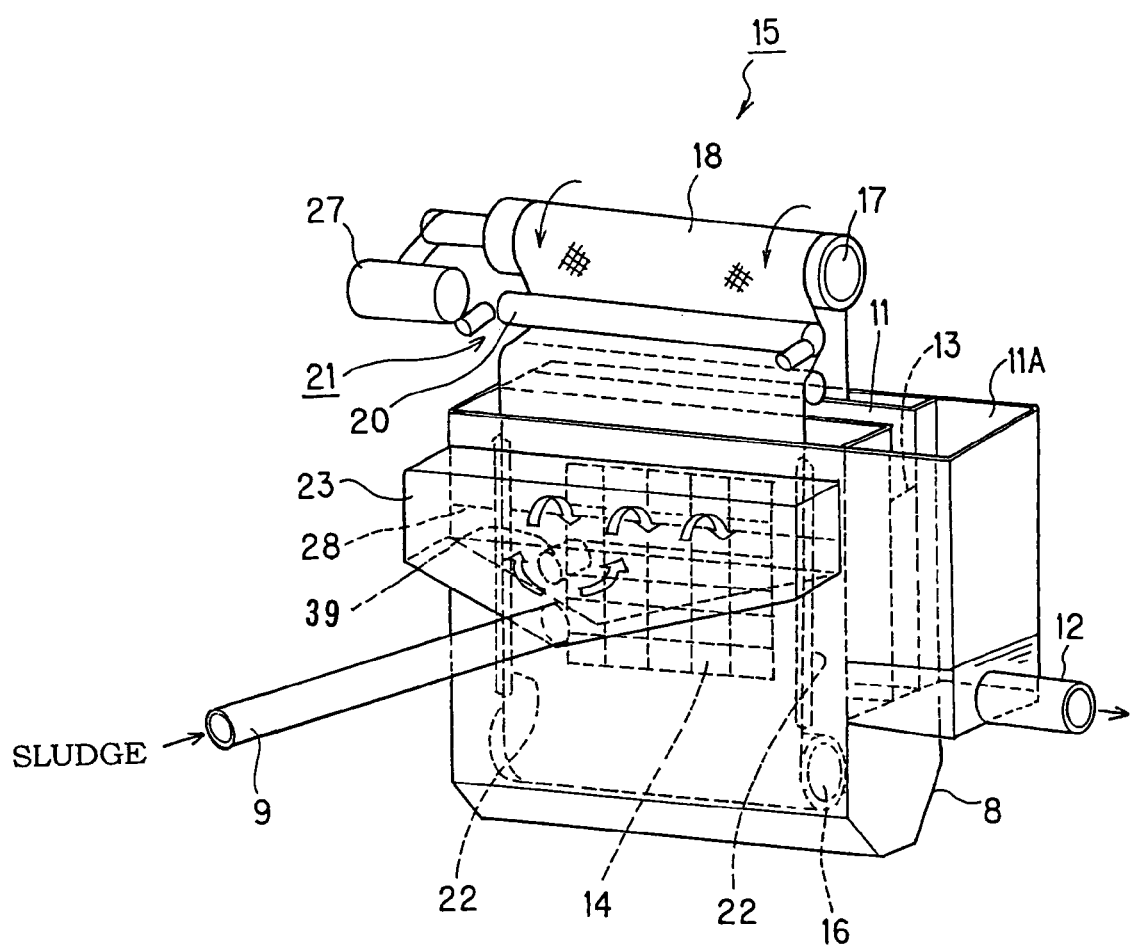
FIG. 6 is a perspective view, as viewed from the filter cloth descending side, illustrating still another sludge concentrating apparatus of the present invention, wherein sludge uniform feeding means is provided.
Figure 7:
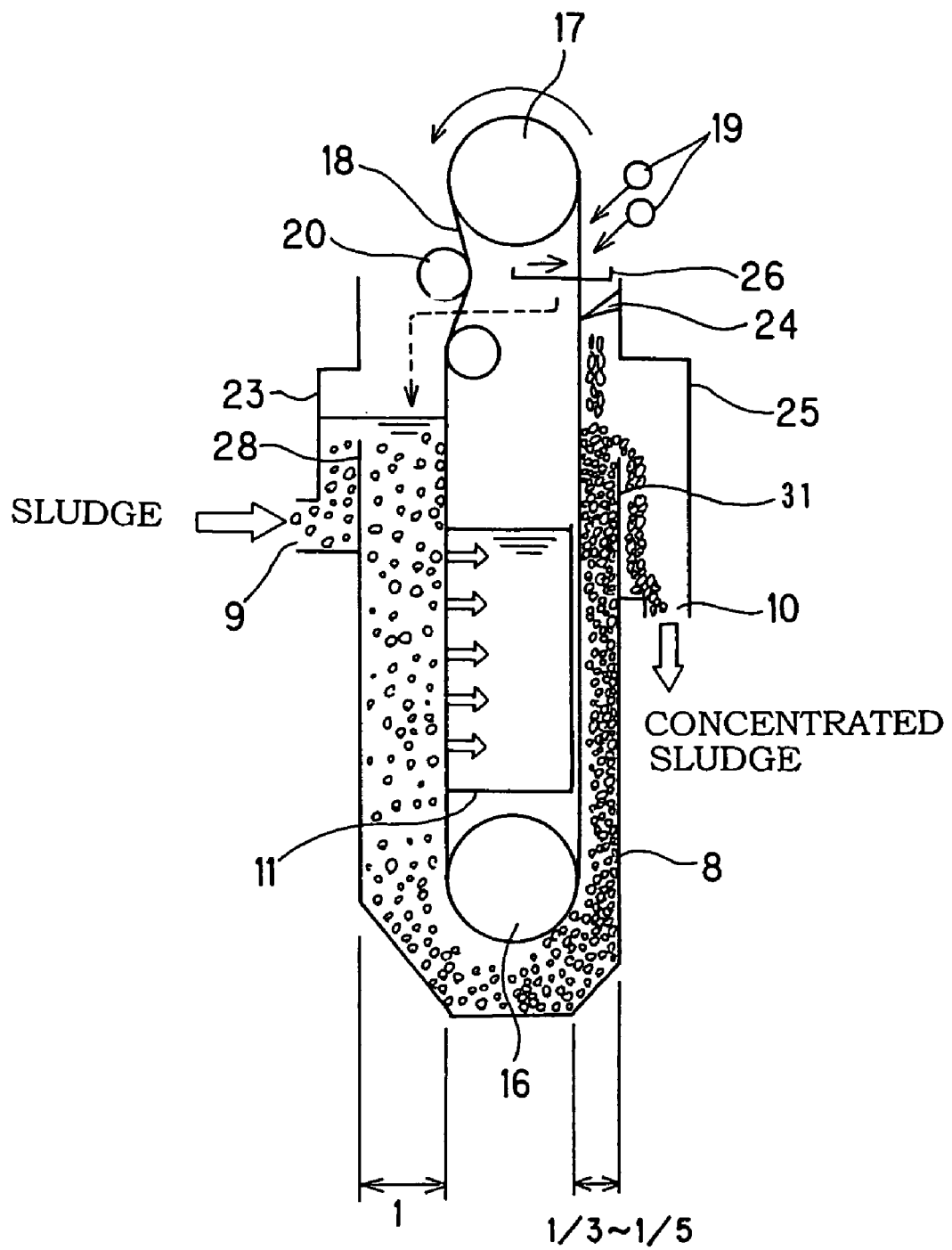
FIG. 7 is a sectional view illustrating still another sludge concentrating apparatus of the present invention, wherein sludge uniform feeding means is provided.
Figure 8:
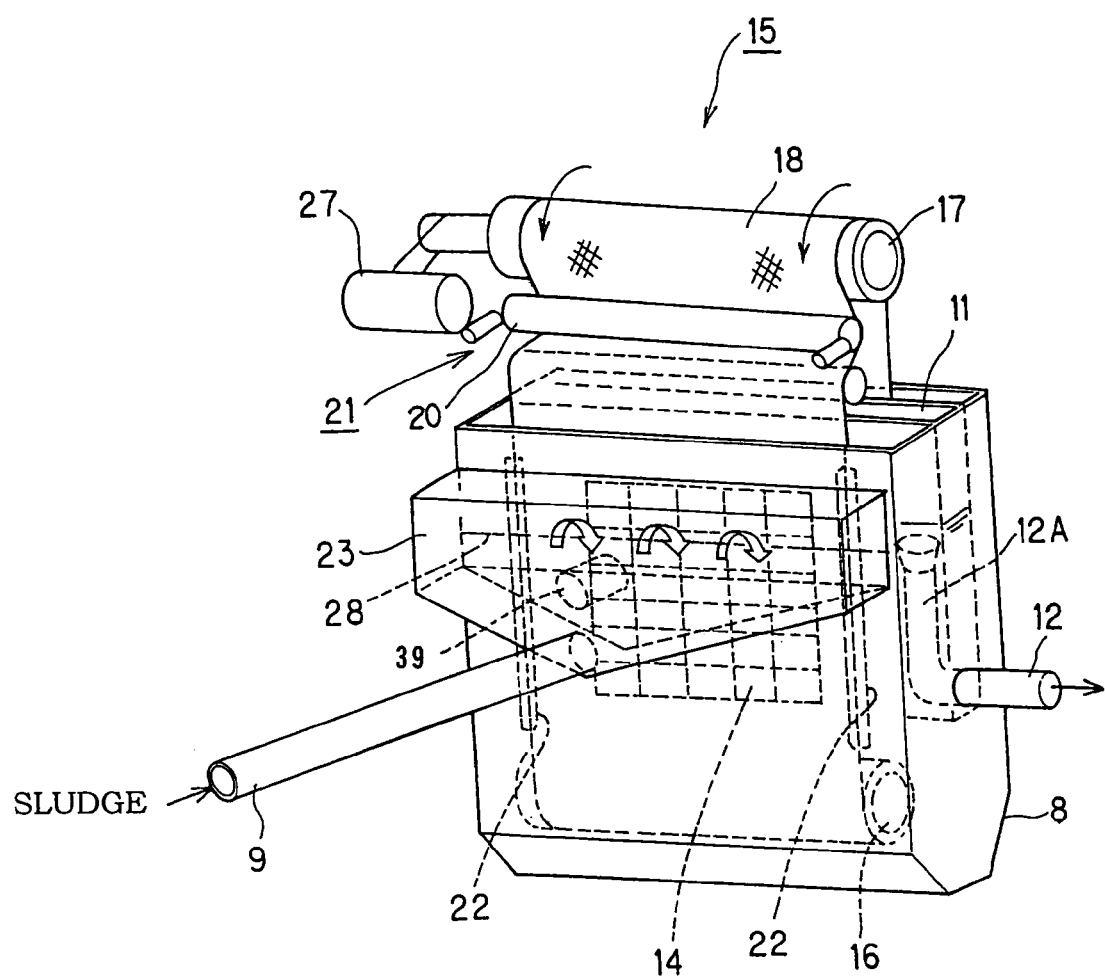
FIG. 8 is a perspective view, as viewed from the filter cloth descending side, illustrating another sludge concentrating apparatus of the present invention, wherein a filtrate chamber is provided in the sludge tank.
Figure 9:
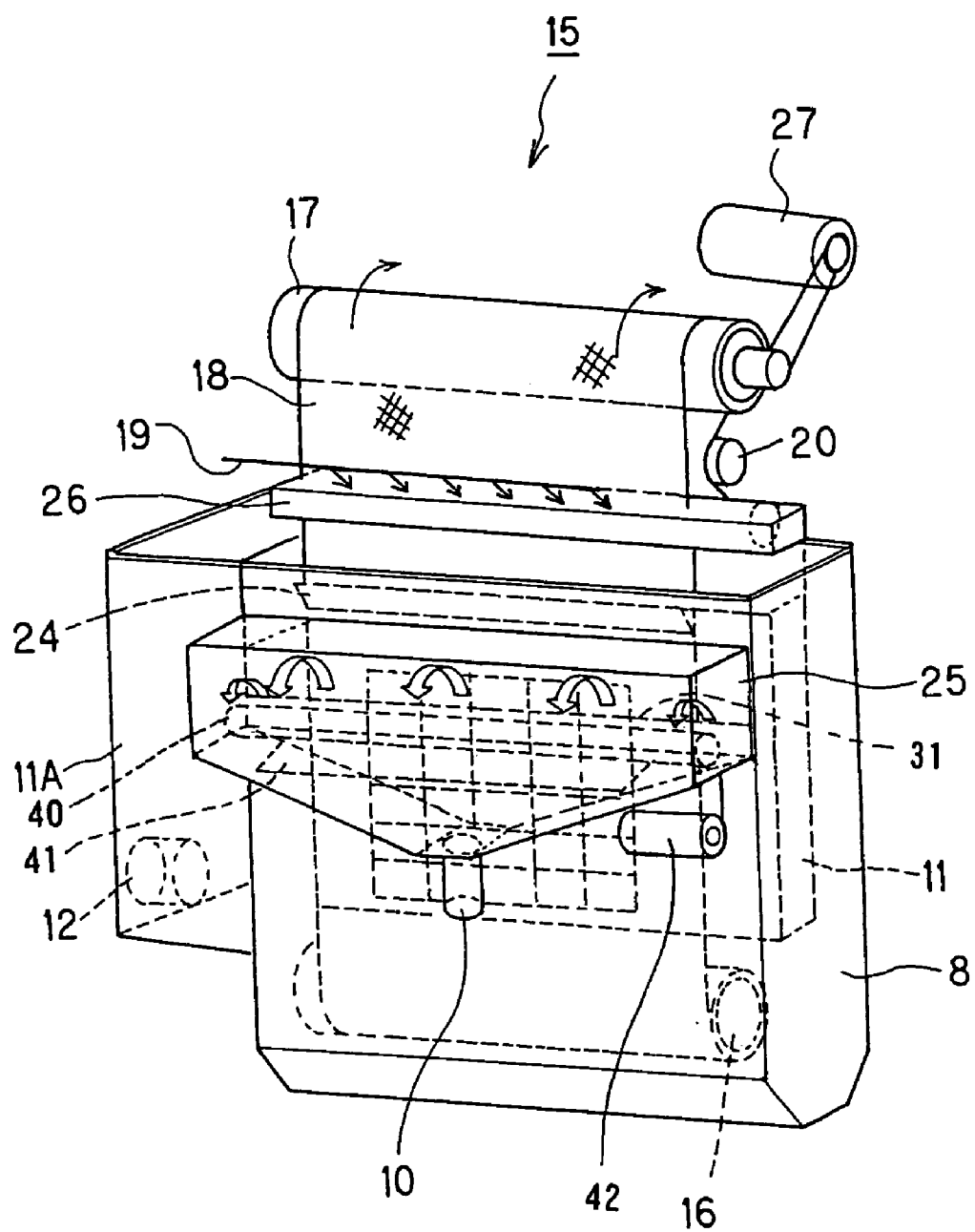
FIG. 9 is a perspective view, as viewed from the filter cloth ascending side, illustrating another sludge concentrating apparatus of the present invention, wherein a sludge uniform discharge means is provided.
Figure 10:
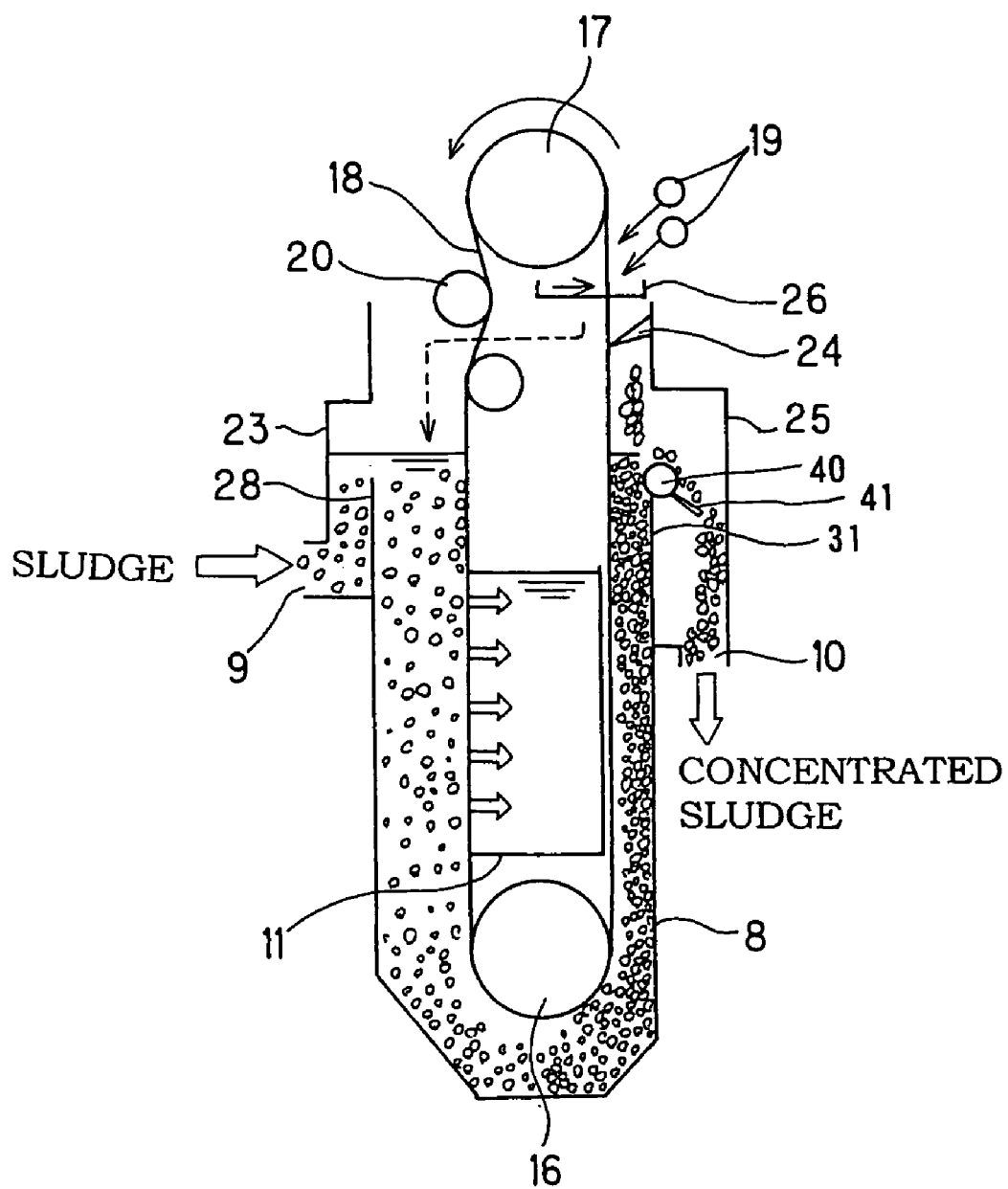
FIG. 10 is a sectional view illustrating another sludge concentrating apparatus of the present invention, wherein sludge uniform discharge means is provided.
Figure 11:
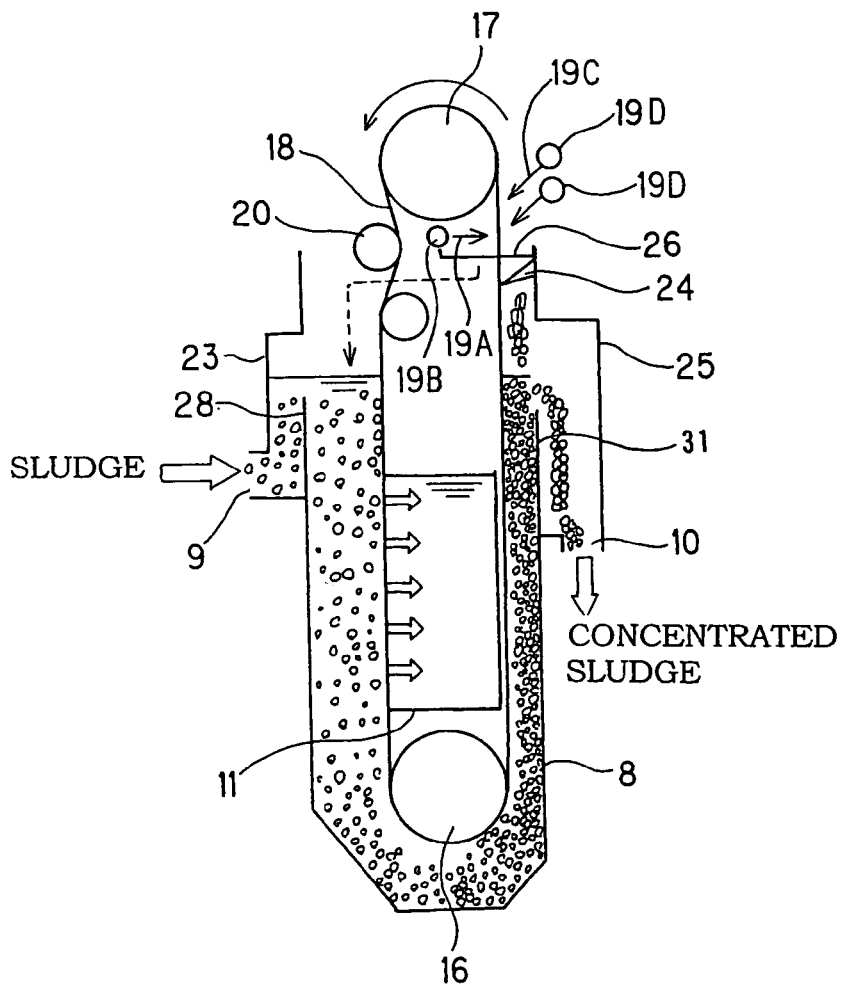
FIG. 11 is a sectional view illustrating a sludge concentrating apparatus of the present invention having cleaning spray nozzles arranged in a staggered form.
Figure 12:
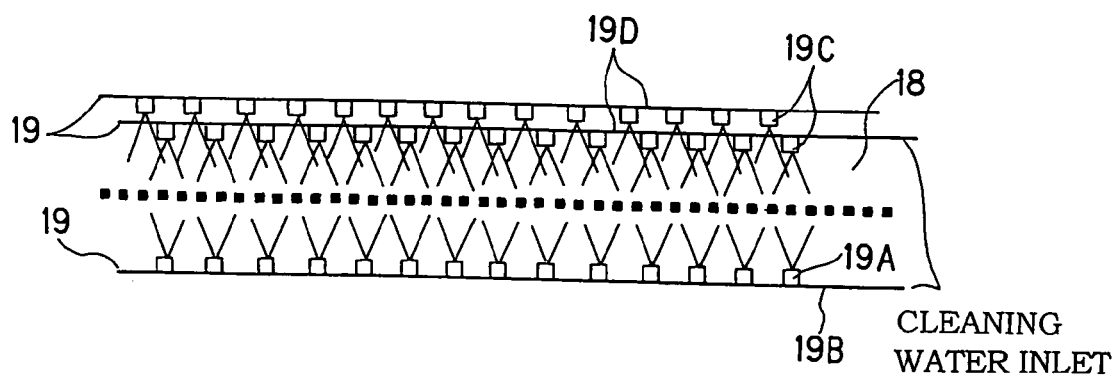
FIG. 12 is a plan view illustrating cleaning means having cleaning spray nozzles arranged in a staggered form.
Figure 13:
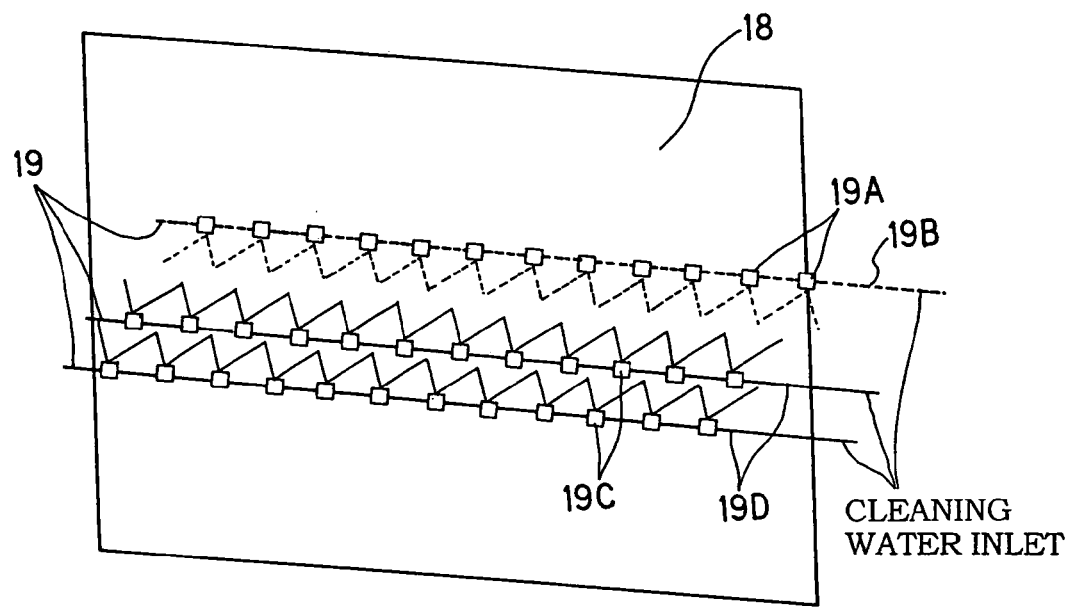
FIG. 13 is a perspective view illustrating cleaning means having cleaning spray nozzles arranged in a staggered form.
Figure 14:
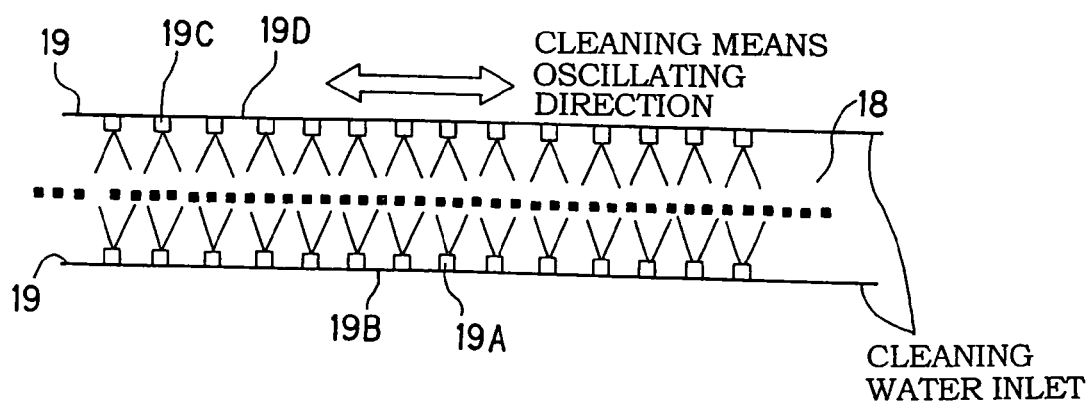
FIG. 14 is a plan view illustrating cleaning means having oscillatory cleaning spray nozzles.
Figure 15:
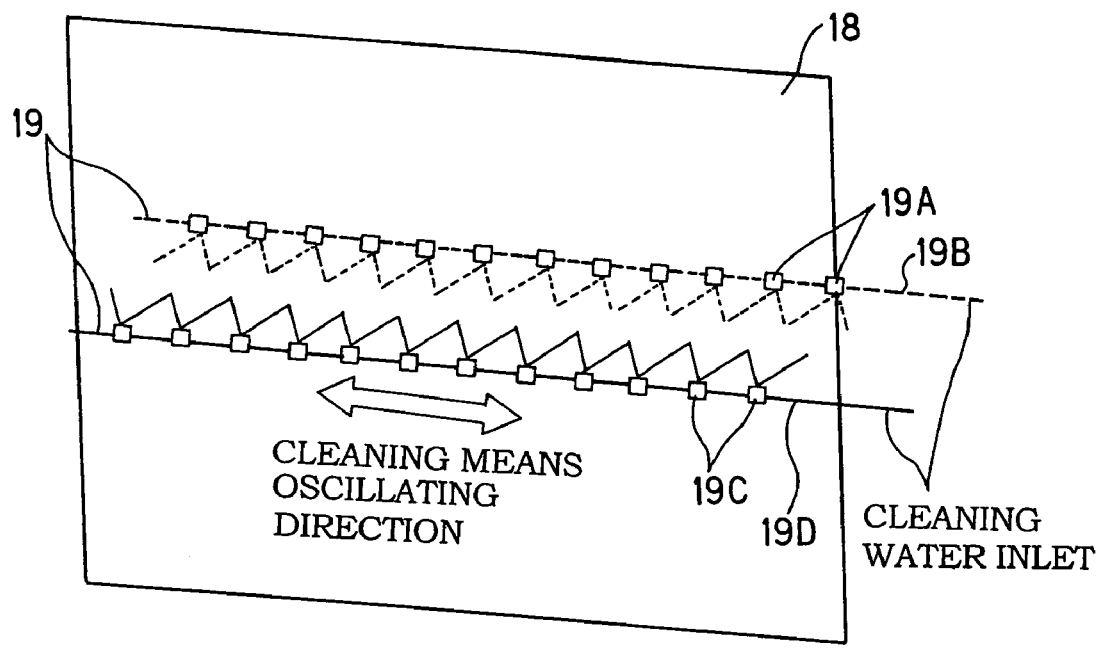
FIG. 15 is a perspective view illustrating cleaning means having oscillatory cleaning spray nozzles.
Figure 16:
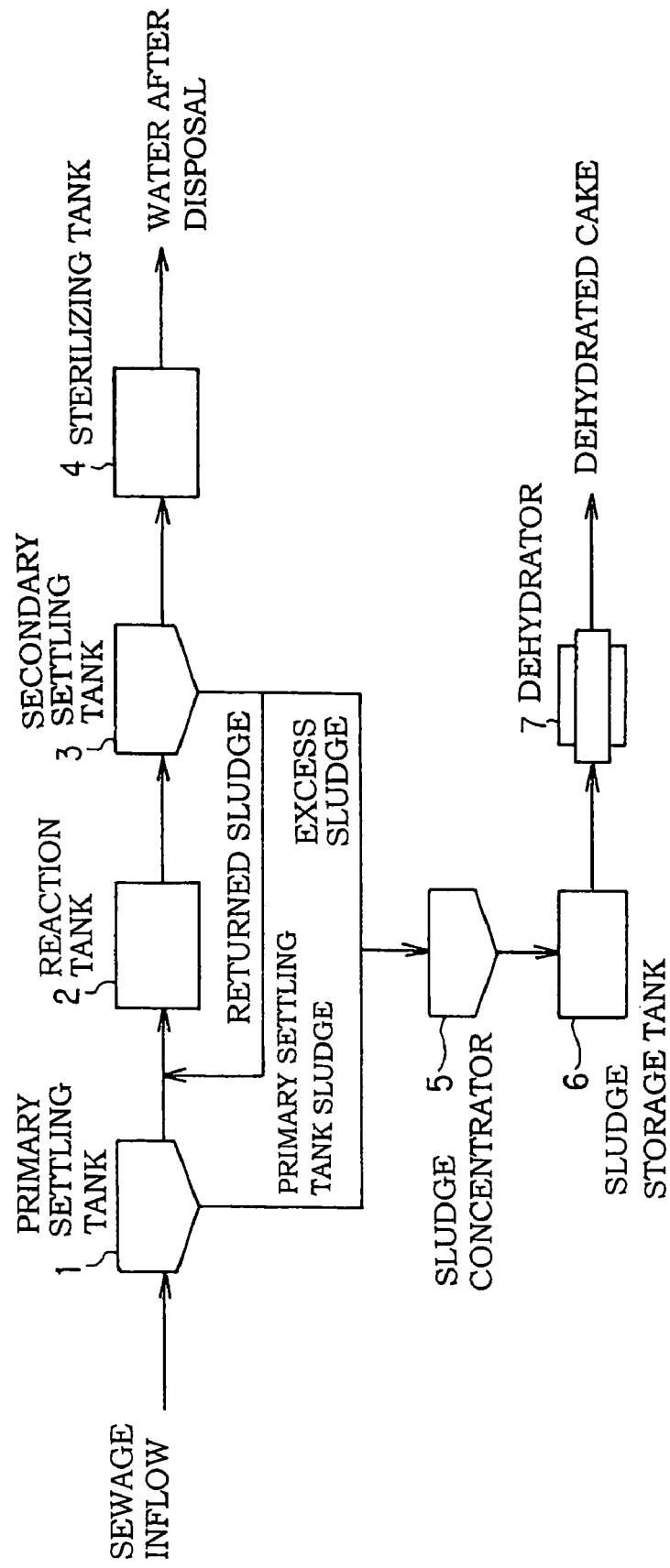
FIG. 16 is a flowchart illustrating a sludge concentrating method applied in a sewage disposal plant.

FIG. 6 is a perspective view, as viewed from the filter cloth descending side, illustrating still another sludge concentrating apparatus of the present invention, wherein sludge uniform feeding means is provided; FIG. 7 is a sectional view illustrating further another sludge concentrating apparatus of the present invention, wherein sludge uniform feeding means is provided; FIG. 8 is a perspective view, as viewed from the filter cloth descending side, illustrating another sludge concentrating apparatus of the present invention, wherein a filtrate chamber is provided in the sludge tank; FIG. 9 is a perspective view, as viewed from the filter cloth ascending side, illustrating another sludge concentrating apparatus of the present invention, wherein a sludge uniform discharge means is provided; FIG. 10 is a sectional view illustrating another sludge concentrating apparatus of the present invention, wherein sludge uniform discharge means is provided; FIG. 11 is a sectional view illustrating a sludge concentrating apparatus of the present invention having cleaning spray nozzles arranged in a staggered form; FIG. 12 is a plan view illustrating cleaning means having cleaning spray nozzles arranged in a staggered form; FIG. 13 is a perspective view illustrating cleaning means having cleaning spray nozzles arranged in a staggered form; FIG. 14 is a plan view illustrating cleaning means having oscillatory cleaning spray nozzles; and FIG. 15 is a perspective view illustrating cleaning means having oscillatory cleaning spray-nozzles.

In FIGS. 6 to 11, the same reference numerals as in FIGS. 1 to 4 represent the same component parts, and a detailed description thereof is omitted here, More specifically, reference numeral 8 represents a sludge tank; 9, a sludge feed pipe; 10, a concentrated sludge discharge pipe; 11, a filtrate chamber; 11A, an exit side chamber; 12, a filtrate discharge pipe; 12A, a riser tube; 13, a weir; 14, a filtrate introducing port; 15, a filtering means; 16, a lower roller; 17, an upper roller; 18, a filter cloth; 19, a cleaning means; 20, a tensioning roller; 21, filter cloth tensioning means; 22, sealing means; 23, a sludge distributing tank; 24, solid stripping means; 25, a concentrated sludge discharge tank; 26, cleaning discharge water collecting means; 27, driving means; and 28, an inlet side weir, respectively.

The sludge concentrating apparatus of the present invention shown in FIGS. 6 to 11 is characterized in that sludge uniform feeding means is provided in the sludge distributing tank 23. The sludge uniform feeding means comprises a combination of a flow adjustment device 39 with the inlet side weir 28 provided at the sludge flow exit of the sludge distributing tank 23, but the flow adjustment device 39 alone is applicable. The inlet side weir 28 is a submerged weir so as to maintain the cohesive state of sludge. The flow adjustment device 39 is formed into a cylindrical shape so as to ensure smooth supply of sludge. The sludge fed from the sludge feed pipe 9 by the sludge uniform feeding means is supplied uniformly in the width direction of the filter cloth 18 in the sludge tank 8.

Another feature of the sludge concentrating apparatus of the present invention lies in the cleaning means 19. The cleaning means 19 must have a structure capable of permitting cleaning of the surface and back of the filter cloth 18 and preventing uneven cleaning. In the cleaning means 19 having such a structure, for example as shown in FIGS. 12 and 13, an inside header pipe 19B having a plurality of inside spray nozzles 19A attached thereto at certain intervals is horizontally (in the filter cloth width direction) arranged in the inside of the filter cloth 18, and two outside header pipes 19D, each having a plurality of outside spray nozzles 19C attached at certain intervals are horizontally (in the filter cloth width direction) arranged to the outside of the filter cloth 18, and outside spray nozzles 19C of the neighboring outside header pipe 19D are arranged alternately in a staggered form. A plurality of inside header pipes 19B may be arranged with inside spray nozzles 19A arranged in a staggered form. Or, a plurality of header pipes may be arranged in and outside, with inside and outside spray nozzles arranged in a staggered form. Further, a plurality of spray nozzles 19A may be arranged in a staggered form on a single header pipe 19B.

As shown in FIGS. 14 and 15, the outside header pipe 19D may be oscillated horizontally (in a filter cloth width direction). In this case, the inside header pipe 19B may be oscillated, or both the inside and outside header pipes 19B and 19D may be oscillated.

Still another feature of the sludge concentrating apparatus of the present invention lies in that the sludge uniform discharge means is provided in the concentrated sludge discharge tank 25. As shown in FIGS. 9 and 10, the sludge uniform discharge means comprises a roller 40 and a scraper 41 serving as deposit stripping means which strips off deposit adhering to the roller 40. The sludge uniform discharge means forcedly discharge deposit simultaneously with the concentrated waste liquid so that deposit mixed in the concentrated waste liquid discharged from the exit side weir 31 is prevented from adhering to the exit side weir 31 and from being an obstacle to discharge of the concentrated waste liquid. Since the concentrated waste liquid having a high concentration is low in fluidity, it is necessary to discharge the same from the sludge tank 8 uniformly in the width direction of the sludge tank 8. The roller 40 of the sludge uniform discharge means is therefore installed horizontally in parallel with the exit side weir 31. The roller 40 is rotated by driving means 42 or in conjunction with driving means 27.

Further another feature of the sludge concentrating apparatus of the present invention lies in that, as shown in FIG. 7, the distance between the inner wall surface of the sludge tank 8 at the concentrated sludge discharge side and the outer surface of the filter cloth 18 is smaller than the distance between the inner wall surface of the sludge tank 8 at the sludge feeding side and the filter cloth 18 outer surface. More specifically, the former is ⅓ to ⅕ the latter. This permits stable discharge even when disposing of a high concentration sludge.

The configuration having the above-mentioned features is of course applicable to the sludge concentrating apparatus shown in FIGS. 1 to 4.

According to the present invention, as described above, the following advantages are provided:

(1) Since solid/liquid separation and concentration of sludge of a sewage disposal plant can be continuously carried out in a large amount, the sludge concentrating apparatus of the present invention is applicable in place of a conventional mechanical concentrating equipment such as a gravity thickening tank or a centrifugal concentrator;

(2) The sludge concentrating apparatus of the present invention has a large disposal ability per area of installation and requires only a low power consumption. Therefore, when applying it in place of a conventional gravity thickener, it is possible to largely reduce the area of installation so far required, and when applying it in place of a conventional centrifugal concentrator, the disposal cost can be largely curtailed.

(3) The solid and phosphorus concentrations of filtrate can be largely reduced as compared with the case of the conventional mechanical concentrator.

(4) A stable concentration of concentrated sludge is available, not depending upon properties of sludge. It is therefore possible to safely operate the dehydrator during the dehydrating step of the latter stage of the process, and to downsize the dehydrating equipment.

What is claimed is:

1. A sludge concentrating apparatus comprising:
   a sludge tank which stores sludge;
   filtering means comprising a filter cloth that is shaped as an endless belt, and a plurality of rollers which turn the cloth, at least a lowermost one of the rollers being immersed in said sludge;
   a filtrate chamber including a filtrate introducing port through which filtrate from the filtering means flows into the filtrate chamber, the filter cloth being kept in close contact with the filtrate introducing port;
   cleaning means for removing sludge cakes adhering to the filter cloth;
   means for keeping a level of liquid in the filtrate chamber substantially constant;
   a sludge introducing means for introducing sludge to the sludge tank, said sludge introducing means being provided near an upper end of the filtrate introducing port; and
   concentrated sludge discharge means for discharging sludge from the sludge tank, said concentrated sludge discharge means being provided at a position substantially opposite to the sludge introducing means with the filter cloth therebetween;
   wherein the means for keeping the liquid level in the filtrate chamber substantially constant comprises one of: (a) a weir provided at a boundary between the filtrate chamber and an exit chamber into which the filtrate from the filtrate chamber flows, and (b) a riser tube which extends vertically in the filtrate chamber and communicates with a discharge pipe through which filtrate is discharged from the filtrate chamber.

2. The sludge concentrating apparatus according to claim 1, further comprising:
   coagulant adding means for adding coagulant to the sludge fed into the sludge tank; and
   acid adding means for adding acid to the sludge fed into the sludge tank.

3. The sludge concentrating apparatus according to claim 2, wherein the acid is sulfuric acid, and the coagulant is poly ferric sulfate.

4. The sludge concentrating apparatus according to claim 3, wherein the sludge introducing means comprises sludge uniform feeding means for causing the sludge fed into the sludge tank to be fed uniformly in a width direction of the filter cloth.

5. The sludge concentrating apparatus according to claim 2, wherein the sludge introducing means comprises sludge uniform feeding means for causing the sludge fed into the sludge tank to be fed uniformly in a width direction of the filter cloth.

6. The sludge concentrating apparatus according to claim 1, wherein the sludge introducing means comprises sludge uniform feeding means for causing the sludge fed into the sludge tank to be fed uniformly in a width direction of the filter cloth.

7. The sludge concentrating apparatus according to claim 6, wherein the sludge uniform feeding means comprises at least one of a submerged weir and a flow adjustment device.

8. The sludge concentrating apparatus according to claim 1, wherein a distance between an inner wall surface of the sludge tank at a concentrated sludge discharge side thereof and an outer surface of the filter cloth at the concentrated sludge discharge side is smaller than a distance between an inner wall surface of the sludge tank at a sludge introducing side thereof and an outer surface of the filter cloth at the sludge introducing side.

9. The sludge concentrating apparatus according to claim 1, wherein the concentrated sludge discharge means comprises sludge uniform discharge means for causing the sludge discharged from the sludge tank to be discharged uniformly in a width direction of said sludge tank.

10. The sludge concentrating apparatus according to claim 9, wherein the sludge uniform discharge means is provided downstream of an exit weir of the concentrated sludge discharge means and comprises a roller and deposit stripping means for stripping off deposit adhering to the roller.

11. The sludge concentrating apparatus according to claim 1, wherein the cleaning means comprises a plurality of cleaning spray nozzles arranged in a staggered form, which are fed from at least one header pipe.

12. The sludge concentrating apparatus according to claim 1, wherein the cleaning means is adapted to oscillate.

* * * * *